United States Patent [19]
Gustafson

[11] Patent Number: 5,329,078
[45] Date of Patent: Jul. 12, 1994

[54] ELEVATOR CAR POSITION INDICATOR FOR USE BY VISUALLY IMPAIRED PERSONS

[75] Inventor: Gordon E. Gustafson, Verona, N.J.

[73] Assignee: Inventio AG, Hergiswil, Switzerland

[21] Appl. No.: 946,880

[22] Filed: Sep. 17, 1992

[51] Int. Cl.$^5$ .............................. B66B 3/02; G08B 1/00
[52] U.S. Cl. .................................. 187/136; 187/130; 340/407.2
[58] Field of Search ............... 187/1 R, 130, 135, 136; 340/407

[56] References Cited

U.S. PATENT DOCUMENTS

| | | | |
|---|---|---|---|
| 3,659,354 | 5/1972 | Sutherland | 35/35 A |
| 4,033,053 | 7/1977 | Engler | 35/35 A |
| 4,191,945 | 3/1980 | Hannen et al. | 340/407 |
| 4,742,198 | 5/1988 | Martin et al. | 200/296 |
| 4,742,894 | 5/1988 | Ujihara | 187/136 |
| 4,752,772 | 6/1988 | Litt et al. | 340/712 |
| 4,871,992 | 10/1989 | Petersen | 340/407 |
| 5,004,076 | 4/1992 | Chen et al. | |

FOREIGN PATENT DOCUMENTS

| | | |
|---|---|---|
| 0197252 | 10/1986 | European Pat. Off. . |
| 0280608 | 8/1988 | European Pat. Off. . |
| 0446487 | 9/1991 | European Pat. Off. . |
| 2832973 | 2/1979 | Fed. Rep. of Germany . |
| 3018570 | 1/1991 | Japan . |
| 4223981 | 8/1992 | Japan . |

Primary Examiner—Steven L. Stephan
Assistant Examiner—Robert Nappi
Attorney, Agent, or Firm—Howard & Howard

[57] ABSTRACT

An elevator car position indicator utilizes a plurality of indicating pins whereby a visually impaired passenger in the elevator car is able to determine the actual car position by touch. The pins are arranged in a Braille configuration at a face plate of the car control station. The indicating pins are connected with armatures of electromagnets and are guided in apertures formed in the face plate. The electromagnets are connected through a control circuit to a coding circuit to which is supplied the car position information wherein the car position is transformed into the corresponding number in Braille and the corresponding indicating pins are pushed out from the face plate.

4 Claims, 1 Drawing Sheet

ELEVATOR CAR POSITION INDICATOR FOR USE BY VISUALLY IMPAIRED PERSONS

BACKGROUND OF THE INVENTION

The present invention relates generally to an apparatus for indicating elevator car position and, in particular, to an elevator car position indicator for use by visually impaired persons.

Typical car position indicators used in elevator cars have light emitting diodes arrays which are arranged at the points of intersection of a point matrix, or have seven segment indicators. The car position information is, for example, generated in the binary code and is supplied to suitable coding circuits connected with the point matrix or the seven segment indicator respectively. Since both of these known types of indicators provide only optical indications, such car position indicators are not suitable for use by visually impaired or blind passengers.

Push button switches for use in elevator cars are shown in the U.S. Pat. No. 4,742,198 and in the European patent document EP-A-O 446 487. In use, the number indicating the floor in question is arranged in Braille below the push button with the same number indicating the actual floor, so that the blind passengers can enter calls for their desired destination floor. It is further known that on the floors, in the vicinity of the elevator doors, signboards are arranged indicating the floor number in Braille. Under these circumstances, a blind passenger, in order to ascertain whether the desired floor has been reached, will at every stop of the car at a floor have to read by touch the signboard arranged at each floor, or will have to count the acoustical signals sounding upon passage of each floor.

The present invention seeks to solve the problem of indicating car position to visually impaired or blind passengers so that the drawbacks described above are avoided.

SUMMARY OF THE INVENTION

The present invention concerns an elevator car position indicating apparatus having touch elements arranged in Braille configuration in the form of slidable indicating pins on a face plate of a car control station. The indicating pins are connected with armatures of electromagnets and are guided in apertures in the face plate. The electromagnets are connected to a floor address coding circuit by a control circuit which transforms each floor address signal into the corresponding number in Braille and excites the electromagnet(s) which extend the corresponding indicating pin(s) from the face plate.

The advantage realized with the present invention is that a visually impaired passenger can at any time determine the momentary position of the car, without having to reach out from the car and touch the signboard mounted on the floor at each stop, or without having to count each change of floor signaled acoustically.

The car position indicator according to the present invention is arranged in a face plate at a car control station for indicating a momentary position of an elevator car with respect to floors served by the car, the car being connected to an elevator control having an output for generating floor address signals representing the floors to a coding circuit having an input connected with the elevator control output and having a plurality of outputs each representing one of the floors. The indicator includes: a plurality of slidable indicating pins arranged in a Braille configuration and extending through apertures formed in a face plate of an elevator car control station; a plurality of electromagnets attached to the face plate, each of the electromagnets having an armature connected to one of the indicating pins and having a control connection for receiving electrical power to excite the armature; a control circuit having a plurality of inputs connected with a plurality of outputs of a coding circuit connected to an elevator control, the control circuit having a plurality of outputs each being connected with at least one of the control connections for exciting the electromagnets whereby a position of an associated elevator car is generated as a signal at one of the coding circuit outputs and is transformed into a corresponding floor number in Braille represented by at least an associated one of the indicating pins being extended from the face plate by excitation of the associated electromagnet by the control circuit.

The control circuit includes a plurality of tri-state buffers each having an activating terminal connected with one of the inputs of the control circuit, each of the control circuit inputs being connected to a number of the tri-state buffers equal to a number of the indicating pins assigned to the floor number in Braille, the tri-state buffers each having an input terminal connected to a voltage source input line and each having an output terminal connected to at least one of the control circuit outputs. When an indication of a two digit floor number is desired, the plurality of indicating pins includes two groups of four of the indicating pins, the control circuit outputs representing a number one in both of the groups of four being connected with each other by a conductor, and wherein another tri-state buffer is connected in the conductor between the output terminals of the tri-state buffers connected to the control circuit outputs representing the number one for the floor numbers ten and eleven. The another tri-state buffer has an activating terminal connected to an output of an OR-gate, the OR-gate having a plurality of inputs each connected to an associated one of the control circuit inputs representing the floor numbers eleven and higher.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
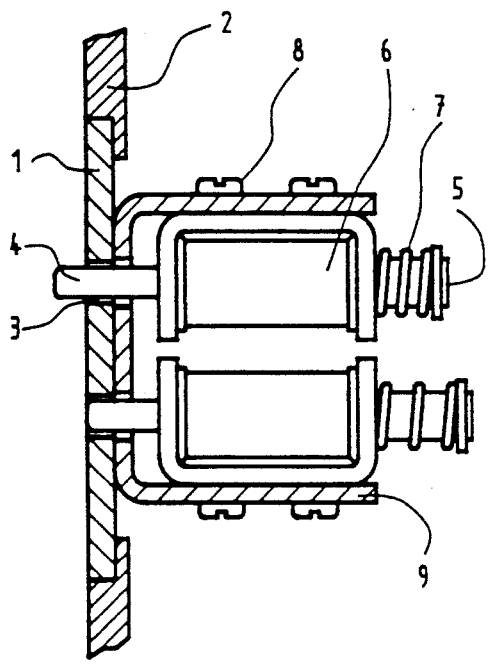
FIG. 1 is a fragmentary right side elevation view of an elevator car control station including a car position indicator according to the present invention.
Figure 2:
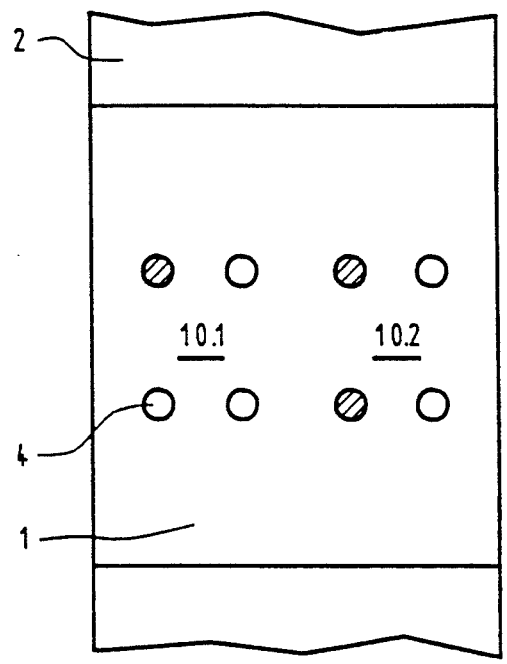
FIG. 2 is a front elevation view of the elevator car control station and car position indicator shown in the FIG. 1.

There is shown in the FIGS. 1 and 2 a front panel or face plate 1 which is attached to an elevator car control station 2. Touch elements are arranged in Braille configuration in the form of a plurality of indicating pins 4 which are slidably guided in apertures 3 formed through the face plate 1. Since only four touch elements are required for the presentation of a single digit number in Braille, the configuration is a square with the indicating pins 4 arranged at its corners. Each of the pins 4 is connected with an armature 5 of an associated one of a plurality of electromagnets 6. Each of the electromagnets 6 includes a return spring 7 encircling the armature 5 and biasing the pin 4 and the armature 5 to a resting position with the pin 4 flush with a front surface of the face plate 1 as shown with respect to the lower pin 4 in the FIG. 1. Each of the electromagnets 6 is attached by means of screws 8 to a mounting bracket 9, which bracket is attached to a back side of the face plate 1.

The indicating pins 4 are dimensioned in such a way that they are pushed out by a predetermined amount from the apertures 3 on excitation of the electromagnets 6 as shown with respect to the upper pin 4 in the FIG. 1. In resting position, the front ends of the indicating pins 4 are all lying in the same plane as the front surface of the face plate 1. For an indication of a two digit number, two groups of four indicating pins 4 each, groups 10.1 and 10.2 respectively shown in the FIG. 2, are provided. An indication of the twelfth floor according to Braille is illustrated by the shaded indicating pins 4 which are protruding in the FIG. 2, the group 10.1 indicating the number one in the tens position and the group 10.2 indicating the number two in the ones position.

Figure 3:
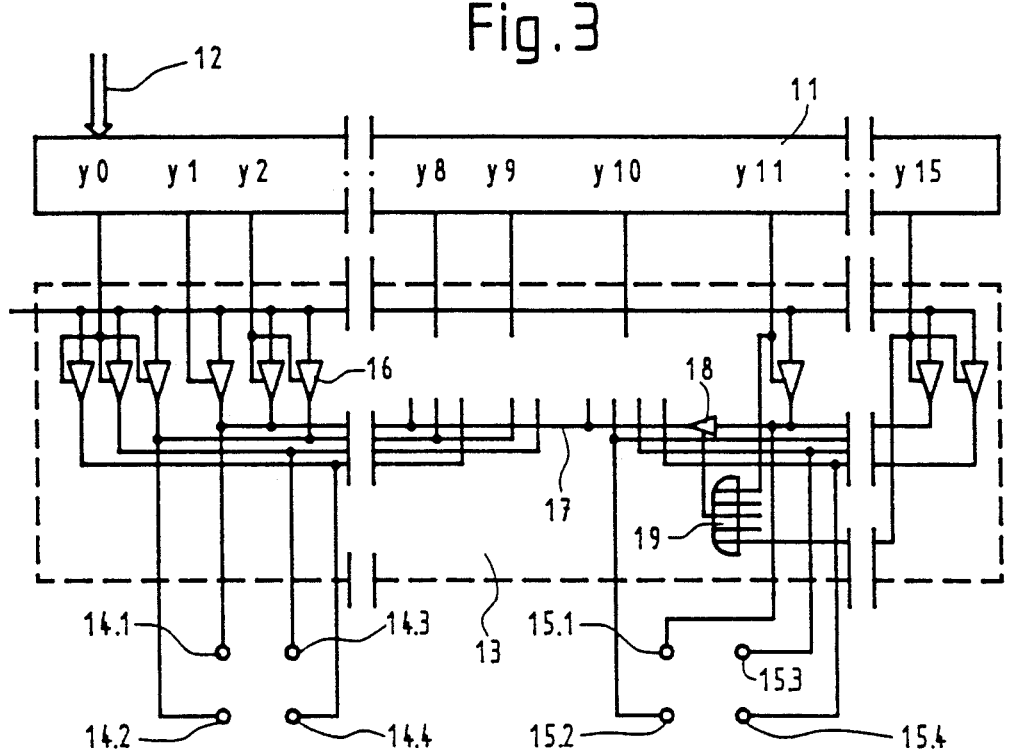
FIG. 3 is a circuit schematic diagram of a control circuit of the car position indicator shown in the FIG. 1.

In the FIG. 3, a coding circuit 11 is shown with an input connected to address circuits (not shown) to receive floor address signals, indicated by an input signal arrow 12, which address circuits are connected to a conventional elevator control (not shown). The coding circuit 11 is, for example, a one-of-n coding circuit which processes address information from sixteen floors, utilizes four bit addresses, and has sixteen outputs y0 through y15 for generating output signals representing the floors zero (basement) through fifteen respectively. The outputs y3 through y7 and y12 through y14 and the associated circuitry are not shown since they are similar to the outputs and associated circuitry illustrated. The outputs y0 through y15 are connected, by way of a control circuit 13, with control connections 14.1 through 14.4 and 15.1 through 15.4 for generally known power switching circuits (not shown) of the electromagnets 6 arranged in the groups of four 10.1 and 10.2 respectively. The control circuit 13 consists of a plurality of switching elements, for example tri-state buffers 16, which each have an input terminal connected to a voltage source input line which can be connected to a common voltage source (not shown), an output terminal connected with one or more of the control connections 14.1 through 14.4 and 15.1 through 15.4, and an activating terminal connected to one of the coding circuit outputs. When a signal is generated at one of the outputs of the coding circuit 11, each of the tri-state buffers 16 having an activating terminal connected to that coding circuit output is enabled to apply the power supply voltage at its input terminal to the armature 5 connected to its output terminal.

The number of the tri-state buffers 16 required for each digit, represented by a signal at one output of the coding circuit 11, is equal to the number of the indicating pins 4 assigned to the actual digit in Braille. Here for example, the presentation of the digit two in Braille requires two tri-state buffers 16 the activating terminals of which are connected to the output y2 and the output terminals of which are connected with the control connections 14.1 and 14.2. The control connections 14.1 and 15.1 of the digit one of both groups of four 10.1 and 10.2 are connected with each other by way of a conductor 17. It is thereby assured that upon indication of the numbers ten through fifteen, the indicating pin 4 of the first group of four 10.1 assigned to the number one is actuated. When the numbers one through eight are indicated, in order to prevent the indicating pin 4 of the second group of four 10.2 assigned to the number one from being actuated over the conductor 17, a gate in the form of another tri-state buffer 18 is provided in the conductor 17 between the connections for the numbers ten and eleven. An input terminal of the tri-state buffer 18 is connected to the control connection 15.1, an output terminal is connected to the control connection 14.1 and an activating terminal is connected with an output of an OR-gate 19. Thus, the tri-state buffer 18 blocks any signal applied to the control connection 14.1. The OR-gate 19 has a plurality of inputs each of which is connected to one of the outputs y11 through y15 of the coding circuit 11. One of the tri-state buffers 16 connected to each of the outputs y11 through y15 also has its output terminal connected to the input terminal of the tri-state buffer 18. Thus, each of the signals at the outputs y11 through y15 will enable the tri-state buffer 18 through the OR-gate 19 to pass a signal at the control connection 15.1 to the control connection 14.1 since the numbers eleven through fifteen require the extension of the indicating pin 4 in the upper left corner of the tens group 10.1 and the ones group 10.2.

The car position indicator described in the preceding operates as follows:

During the travel of the elevator car, four bit addresses corresponding to the successive floors are generated in binary code and fed to the coding circuit 11 at the arrow 12. The floor address can be generated utilizing, for instance, the devices shown in the European patent document EP-A O 197 252 or the German patent document DE-B 28 32 973. Let it now be assumed that the car leaves in an upward direction from the floor number eleven and the address "1110" is formed for the floor number twelve. For this output signal, the output y12 of the one-of-n coding circuit 11 becomes logic "1", so that the assigned tri-state buffers 16 are activated. In this way, the electromagnet 6 of the first group of four 10.1 assigned to the number one is excited by way of the control connection 14.1 and the electromagnets 6 of the second group of four assigned to the number two are excited by way of the control connections 15.1 and 15.2. The assigned indicating pins 4 are thereby extended from the apertures 3 of the face plate 1 and can thus be touched by blind passengers and be recognized as the number twelve.

In summary, the elevator car position indicator according to the present invention utilizes a plurality of indicating pins whereby a visually impaired passenger in the elevator car is able to determine the actual car position by touch. The pins are arranged in a Braille configuration at a face plate of the car control station. Each of the indicating pins is connected with an armature of an associated electromagnet and is guided in an associated aperture formed in the face plate. The electromagnets are connected through a control circuit to a coding circuit to which is supplied the car position information wherein the car position is transformed into the corresponding number in Braille and the corresponding indicating pins are pushed out from the face plate.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A car position indicator arranged in a face plate at a car control station for indicating a momentary position of an elevator car with respect to floors served by the car, the car being connected to an elevator control having an output for generating floor address signals representing the floors to a coding circuit having an input connected with the elevator control output and having a plurality of outputs each representing one of the floors, comprising:

a plurality of slidable indicating pins arranged in a braille configuration and extending through apertures formed in a face plate of an elevator car control station;

a plurality of electromagnets attached to the face plate, each of said electromagnets having an armature connected to one of said indicating pins and having a control connection for receiving electrical power to excite said electromagnet; and a control circuit having a plurality of inputs connected with a plurality of outputs of a coding circuit connected to an elevator control, each of said inputs for receiving a signal representing a floor number of a separate floor served by an elevator associated with the elevator control, said control circuit having a plurality of outputs each being connected with at least one of said control connections for exciting said electromagnets, said control circuit including a plurality of tri-state buffers each having an activating terminal connected with one of said inputs of said control circuit, said tri-state buffers each having an input terminal connected to a voltage source input line and each having an output terminal connected to at least one of said control circuit outputs whereby a signal generated at one of said control signal circuit inputs is transformed into a corresponding floor number in braille represented by at least an associated one of said indicating pins being extended from the face plate by excitation of said associated electromagnet by said control circuit and wherein for an indication of floor numbers from zero through a maximum of nineteen, said plurality of indicating pins includes a first group of four of said indicating pins and a second group of four of said indicating pins, said control circuit outputs representing floor numbers zero through nine being connected to excite said electromagnets associated with said first group of indicating pins, said control circuit outputs representing a units digit of two digit floor numbers from ten through a maximum of nineteen being connected to excite said electromagnets associated with said second group of indicating pins, and including another tri-state buffer having an output terminal connected to said output terminals of said tri-state buffers which control said indicating pins representing the floor number one and a tens digit of the floor number ten, an input terminal connected to said output terminals of said tri-state buffers associated with the floor numbers eleven and above and an activating terminal connected to said control circuit inputs representing the floor numbers eleven and above.

2. The car position indicator according to claim 1 including an OR-gate having a plurality of inputs and an output and wherein said output of said OR-gate is connected to said activating terminal of said another tri-state buffer and each of said inputs of said OR-gate is connected to an associated one of said control circuit inputs representing the floor numbers eleven and above.

3. The car position indicator according to the claim 1 including a mounting bracket attached to a rear surface of the face plate and wherein said electromagnets are attached to said mounting bracket.

4. A car position indicator arranged in a face plate at a car control station for indicating a position of an elevator car with respect to floors served by the car, the car being connected to an elevator control generating floor address signals representing the floors, comprising:

a plurality of slidable indicating pins arranged in a braille configuration extending through apertures formed in a face plate of an elevator car control station;

a plurality of electromagnets attached to the face plate, each of said electromagnets having an armature connected to one of said indicating pins and having a control connection for receiving electrical power to excite said electromagnet;

a coding circuit having an input for receiving a floor address signal representing one of a plurality of floor numbers of floors served by an elevator car and having a plurality of outputs each for generating an output signal representing an associated one of the floor numbers; and a control circuit including a plurality of tri-state buffers each having an activating terminal connected with one of said plurality of outputs of said coding circuit, each said tri-state buffer having an input connected to a voltage source input line and an output connected with at least one of said control connections of said electromagnets and wherein for an indication of a two digit floor number, said plurality of indicating pins includes a first group of four of said indicating pins for floor numbers zero through nine and a second group of four of said indicating pins for a units digit of floor numbers ten and above, said tri-state buffer output associated with the floor number one of said first group being connected to said tri-state buffer output associated with a tens digit of the floor number ten of the second group and to an output of another tri-state buffer, said another tri-state buffer having an input connected to said outputs of said tri-state buffers representing the floor numbers eleven and above, said another tri-state buffer having an activating terminal connected to an output of an OR-gate, said OR-gate having a plurality of inputs each connected to an associated one of said activating terminals of said tri-state buffers representing the units digit of the floor numbers eleven and above whereby a position of the associated elevator car is generated as the floor address signal at said coding circuit input and is transformed into a corresponding floor number in braille represented by at least an associated one of said indicating pins being extended from the face plate by excitation of said associated electromagnets by said control circuit.

* * * * *